United States Patent
Ejima

(10) Patent No.: US 6,188,432 B1
(45) Date of Patent: Feb. 13, 2001

(54) INFORMATION PROCESSING METHOD AND APPARATUS FOR DISPLAYING AND ZOOMING AN OBJECT IMAGE AND A LINE DRAWING

(75) Inventor: Satoshi Ejima, Tokyo (JP)

(73) Assignee: Nikon Corporation, Tokyo (JP)

(*) Notice: Under 35 U.S.C. 154(b), the term of this patent shall be extended for 0 days.

(21) Appl. No.: 08/880,413

(22) Filed: Jun. 23, 1997

(30) Foreign Application Priority Data

Jun. 25, 1996 (JP) .................................................... 8-164289

(51) Int. Cl.[7] .............................. H04N 5/76; H04N 5/262
(52) U.S. Cl. ..................... 348/240; 348/232; 348/239; 348/333.02; 348/333.12; 348/374; 345/127
(58) Field of Search ................................. 345/127, 130, 345/179, 131; 348/207, 222, 239, 240, 333, 334, 358, 231–233, 561, 564, 584, 585, 586, 587, 588, 589; H04N 5/235, 5/225, 5/76, 5/262, 5/222

(56) References Cited

U.S. PATENT DOCUMENTS

| | | | | |
|---|---|---|---|---|
| 5,187,776 | * | 2/1993 | Yanker | 345/127 |
| 5,463,729 | * | 10/1995 | Kitaguchi | 345/433 |
| 5,479,205 | * | 12/1995 | Silverbrook | 348/239 |
| 5,689,742 | * | 11/1997 | Chamberlain | 348/333 |
| 5,856,821 | * | 1/1999 | Funahashi | 345/127 |

* cited by examiner

*Primary Examiner*—Wendy Garber
*Assistant Examiner*—Ngoc-Yen Vu
(74) *Attorney, Agent, or Firm*—Oliff & Berridge, PLC

(57) ABSTRACT

An information processing apparatus can display an object image and a line drawing overlapping each other. An area of the object image can be zoomed (enlarged or reduced) while the line drawing is left the same size, or optionally the line drawing can be zoomed in proportion to the object image zooming, so that the information displayed by the relative positional relationship between the object image and the line drawing is maintained.

14 Claims, 10 Drawing Sheets

INFORMATION PROCESSING METHOD AND APPARATUS FOR DISPLAYING AND ZOOMING AN OBJECT IMAGE AND A LINE DRAWING

INCORPORATION BY REFERENCE

The disclosure of the following priority application is incorporated herein by reference: Japanese patent application No. JP-08-164289, filed on Jun. 25, 1996.

BACKGROUND OF THE INVENTION

1. Field of Invention

The present invention relates to an information processing apparatus, and more particularly an information processing apparatus for use in an electronic camera or the like that records the image of an object after converting it to digital data.

2. Description of Related Art

In recent years, the use of electronic cameras that photograph (shoot) an object and record its image (the object image) using a charge control device (CCD) or the like, and record the object image in an internal memory or in removable memory cards or the like after converting the object image into digital data, is becoming more common in place of cameras that use film. An object image obtained with such an electronic camera may be immediately reproduced and displayed on a liquid crystal display screen (LCD) or the like without going through the developing and printing processes required by conventional cameras.

However, there is no apparatus that allows a user to input an arbitrary line drawing and display the line drawing superimposed on an object image shot with an electronic camera. In addition, there is no apparatus that can zoom up (enlarge) or zoom down (shrink) both a line drawing and an object image simultaneously.

SUMMARY OF THE INVENTION

In view of the above, it would be advantageous to be able to display a line drawing and an object image together, and to be able to zoom the line drawing as the object image is zoomed. An information processing apparatus is therefore presented that can zoom both an object image and a superimposed line drawing.

In an information processing apparatus according to a preferred embodiment of the invention, a first zooming means zooms (enlarges or shrinks) the object image and a second zooming means zooms a line drawing superimposed on the object image. A selection means selects either a first mode in which the second zooming means zooms the line drawing as the first zooming means zooms the object image, or a second mode in which the second zooming means does not zoom the line drawing as the first zooming means zooms the object image. A control means controls the operation of the first zooming means and the second zooming means. The apparatus also includes an imaging means for forming the object image, a line drawing input means, a recording means for recording the object image and the line drawing, and a display means for displaying the object image and/or the line drawing.

By choosing between the first mode and the second mode, a user can select whether a line drawing is zoomed when an accompanying object image is zoomed, depending on whether he believes the relative positional relationship between the object image and line drawing is meaningful. By controlling the apparatus so that while in the first mode the second zooming means zooms the line drawing in response when the first zooming means zooms the object image, the positional relationship between the object image and the line drawing can be kept from changing. Accordingly, even when the object image is zoomed, it is possible to maintain the information denoted by the relative positional relationship between the object image and the line drawing.

BRIEF DESCRIPTION OF THE DRAWING

In the following description of embodiments of the invention, reference is made to the figures of the drawing, in which.

DETAILED DESCRIPTION OF PREFERRED EMBODIMENTS

Figure 1:
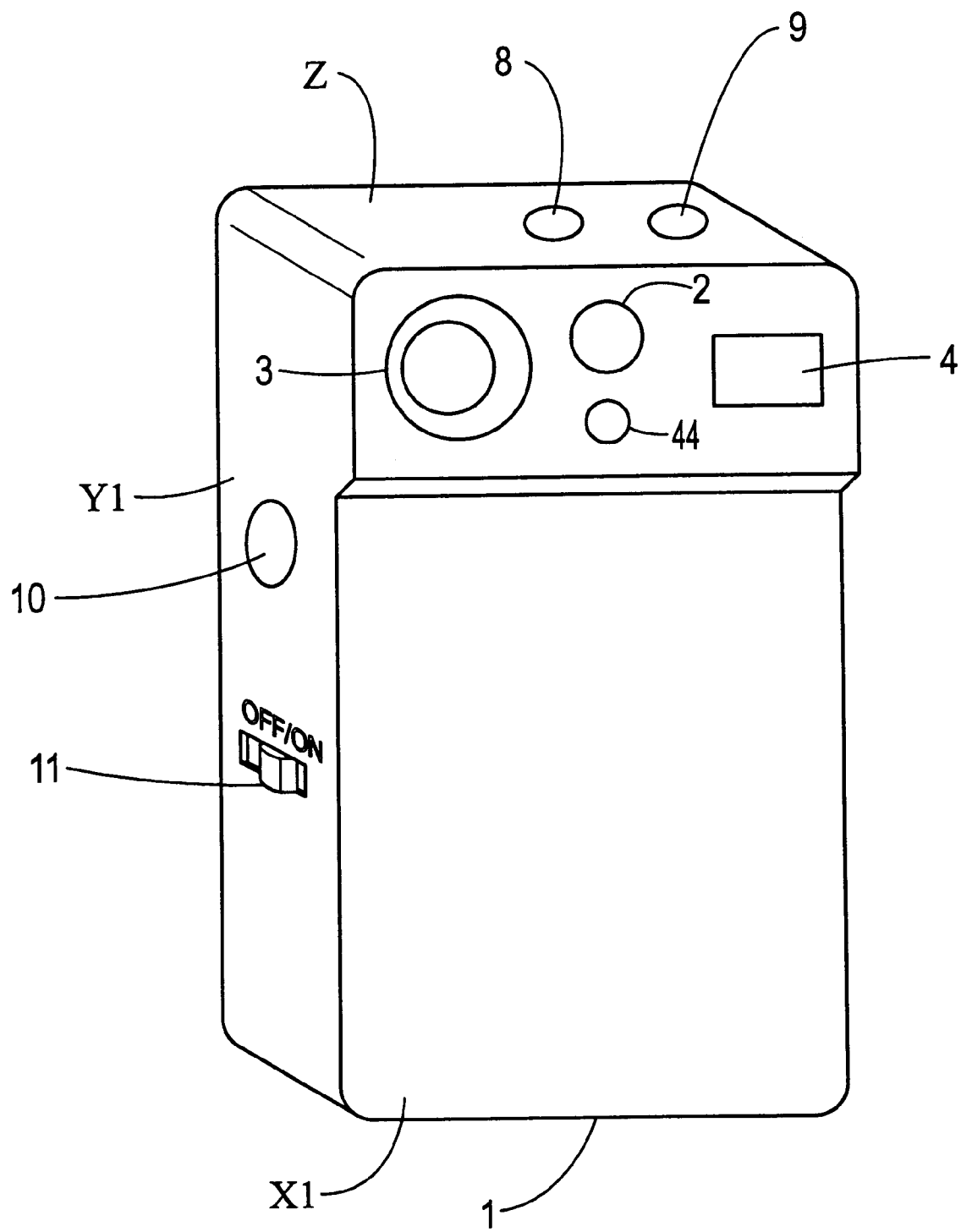
FIG. 1 is an oblique front view of an electronic camera according to a preferred embodiment of the invention.
Figure 2:
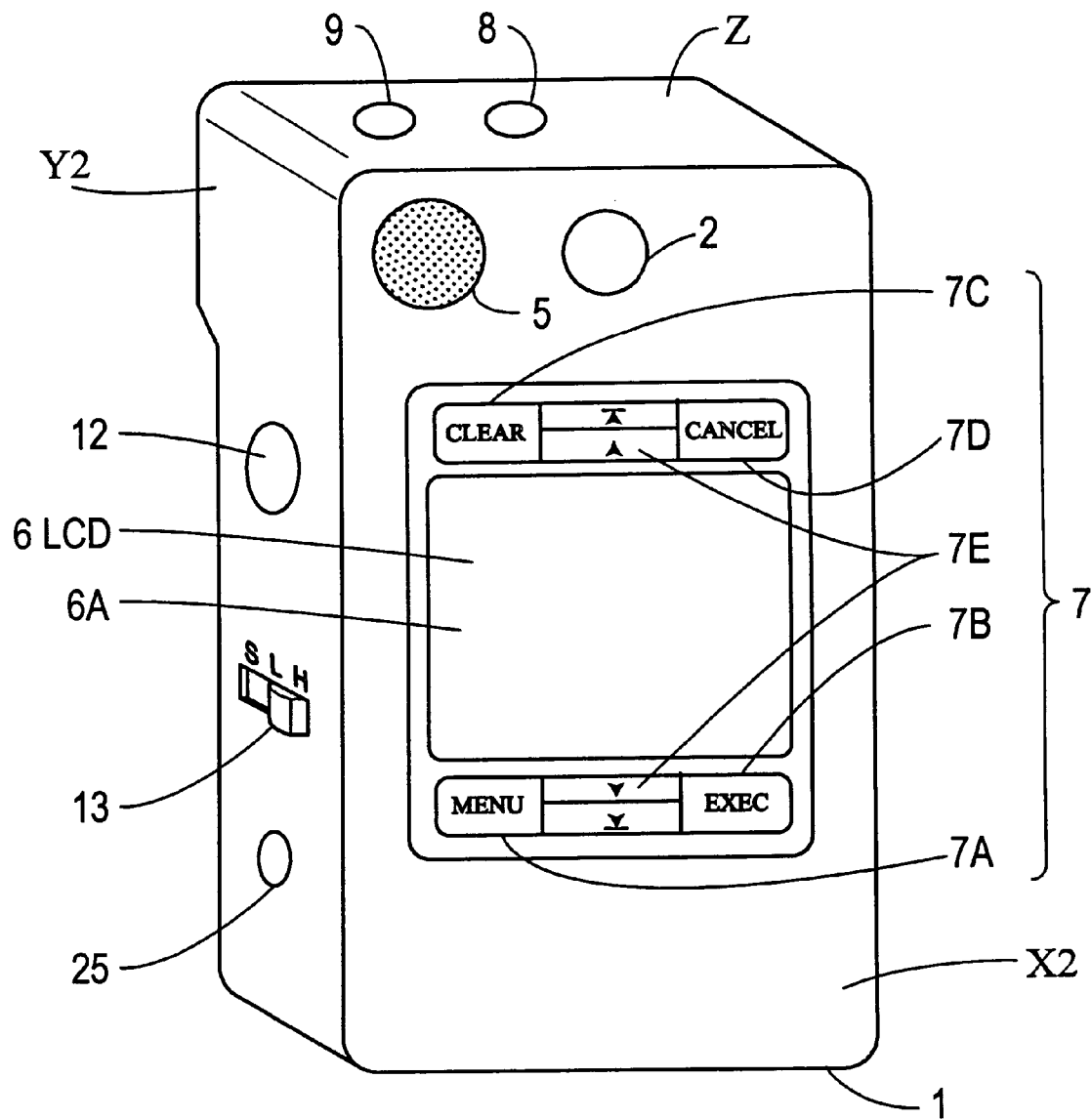
FIG. 2 is an oblique rear view of the electronic camera of FIG. 1.

FIG. 1 and FIG. 2 show a possible configuration for an electronic camera in a preferred embodiment of the present invention. For convenience in the following explanation, the surface facing the object when an object is photographed is called surface X1 and the surface facing the user is called surface X2.

In FIG. 1, near the top of surface X1 are a viewfinder 2 used to verify the shooting range of the object, a shooting lens 3 that acquires the image of the object, a red-eye reduction lamp 44 used to reduce the red-eye phenomenon, and a light-emitting unit or strobe 4 that emits light to illuminate the object (the light-emitting unit is referred to as the "strobe" in this description, since this embodiment uses a strobe, but the invention can be practiced with other types of lightemitting units as well).

Figure 7:
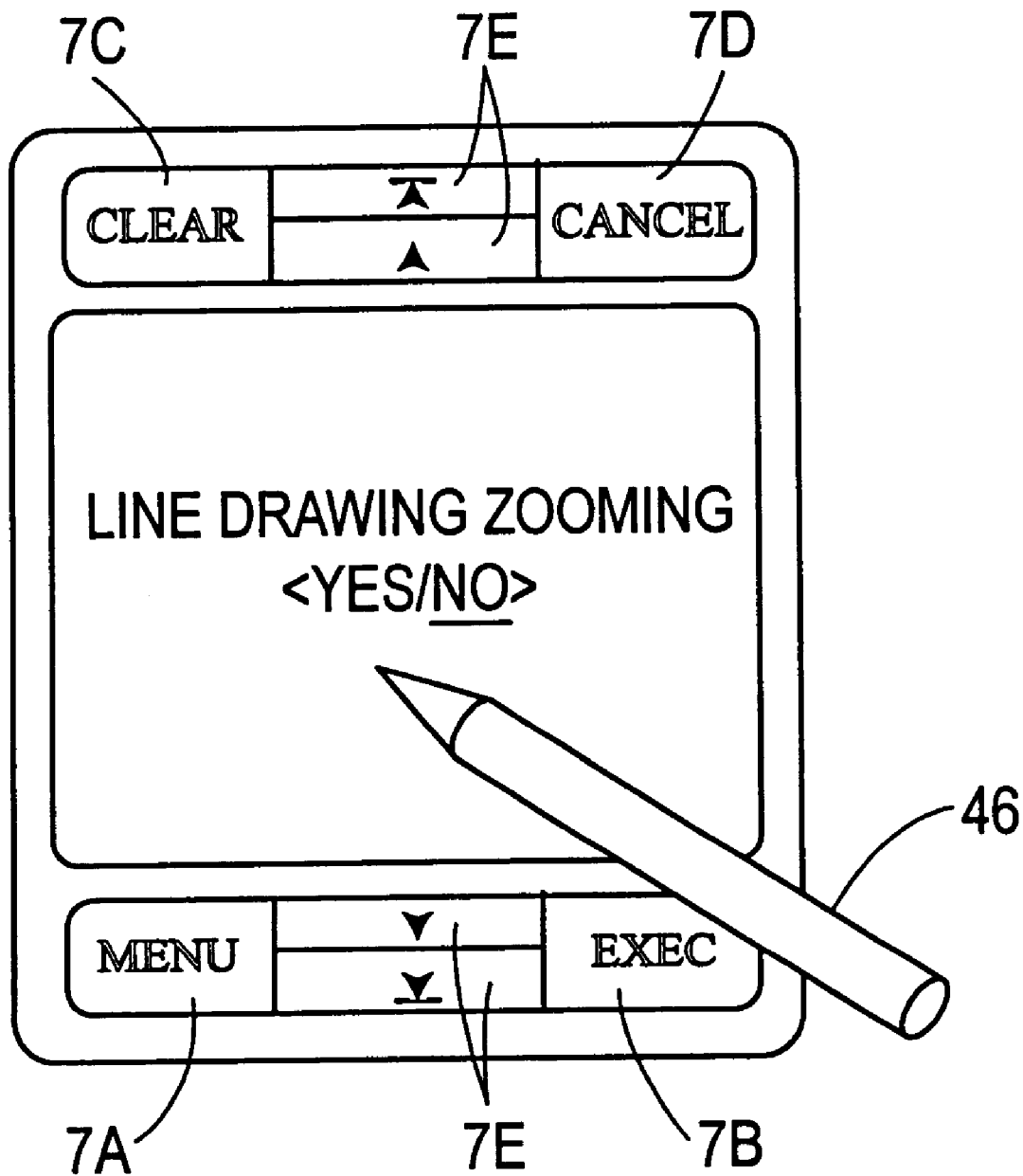
FIG. 7 shows a screen with a touch tablet and a keypad according to a preferred embodiment of the invention.

In FIG. 2, near the top of surface X2 can be seen the viewfinder 2 and a speaker 5. The speaker 5 outputs sound corresponding to sound data recorded on a memory card or the like installed in the electronic camera 1. An LCD 6 and an operation keypad 7 are arranged vertically on surface X2 below the viewfinder 2, the shooting lens 3, the strobe 4, and the speaker 5. On the surface of the LCD 6 is formed a so-called touch tablet 6A that outputs position data corresponding to the position designated by touching a pen-type pointing device (the pen) 46 to touch tablet 6A, as best seen in FIG. 7. The touch tablet 6A is made using transparent material such as glass or resin so that the user can view an object image displayed on the LCD 6 through the touch tablet 6A.

The operation keypad 7 has a number of keys that correspond to various functions and are operated by using the pen 46. The keypad 7 is used to reproduce recorded data such as object image data, sound data, or text data recorded on the internal memory card (or memory), and to display the data on the LCD 6. For example, a menu key 7A is used to display a menu screen on the LCD 6. An execution key 7B is used to reproduce recorded data selected by the user. A clear key 7C is used to erase the recorded data. A cancel key 7D is used to interrupt reproduction of the recorded data. A scroll key 7E is used to scroll the screen vertically when a table of the recorded data is displayed on the LCD 6.

A microphone 8 for sound pickup and an earphone jack 9 to which an earphone (not shown) can be connected are in the top surface (surface Z) of the electronic camera 1. On the left side surface (surface Y1), a release switch 10 and a power source switch 11 are arranged vertically below the viewfinder 2, the shooting lens 3, and the strobe 4, which are near the top of surface X1. Release switch 10 is used to shoot an object, and the power source switch 11 switches the power source on and off.

On the right side surface (surface Y2) are a sound recording switch 12 that operates during sound recording and a continuous shooting mode switch 13. The sound recording switch 12 and the continuous shooting mode switch 13 are arranged vertically below the viewfinder 2, the shooting lens 3, and the strobe 4, which are near the top of surface X1. In the illustrated embodiment, the sound recording switch 12 is placed at substantially the same height as the release switch 10 of surface Y1, so that the user does not feel a difference depending on whether he is using his right or left hand to hold the camera. Alternatively, the height of the sound recording switch 12 and the release switch 10 may be placed at different heights so that when the user presses one switch, the switch on the opposite side surface is not accidentally pressed as well by an opposing finger pressed against the other side surface.

The continuous shooting mode switch 13 allows the user to choose whether pressing the release switch 10 will cause the camera to shoot one frame, or several frames. For example, when switch 13 is switched to the "S" (single frame mode) position, only one frame is shot when the release switch 10 is pressed. But when the continuous shooting mode switch 13 is switched to the "L" (low speed continuous shooting mode) position, the camera shoots eight frames per second while the release switch 10 is pressed. Finally, if the continuous shooting mode switch 13 is switched to the "H" (high speed continuous shooting mode) position, the camera shoots 30 frames per second while the release switch 10 is depressed.

Figure 3:
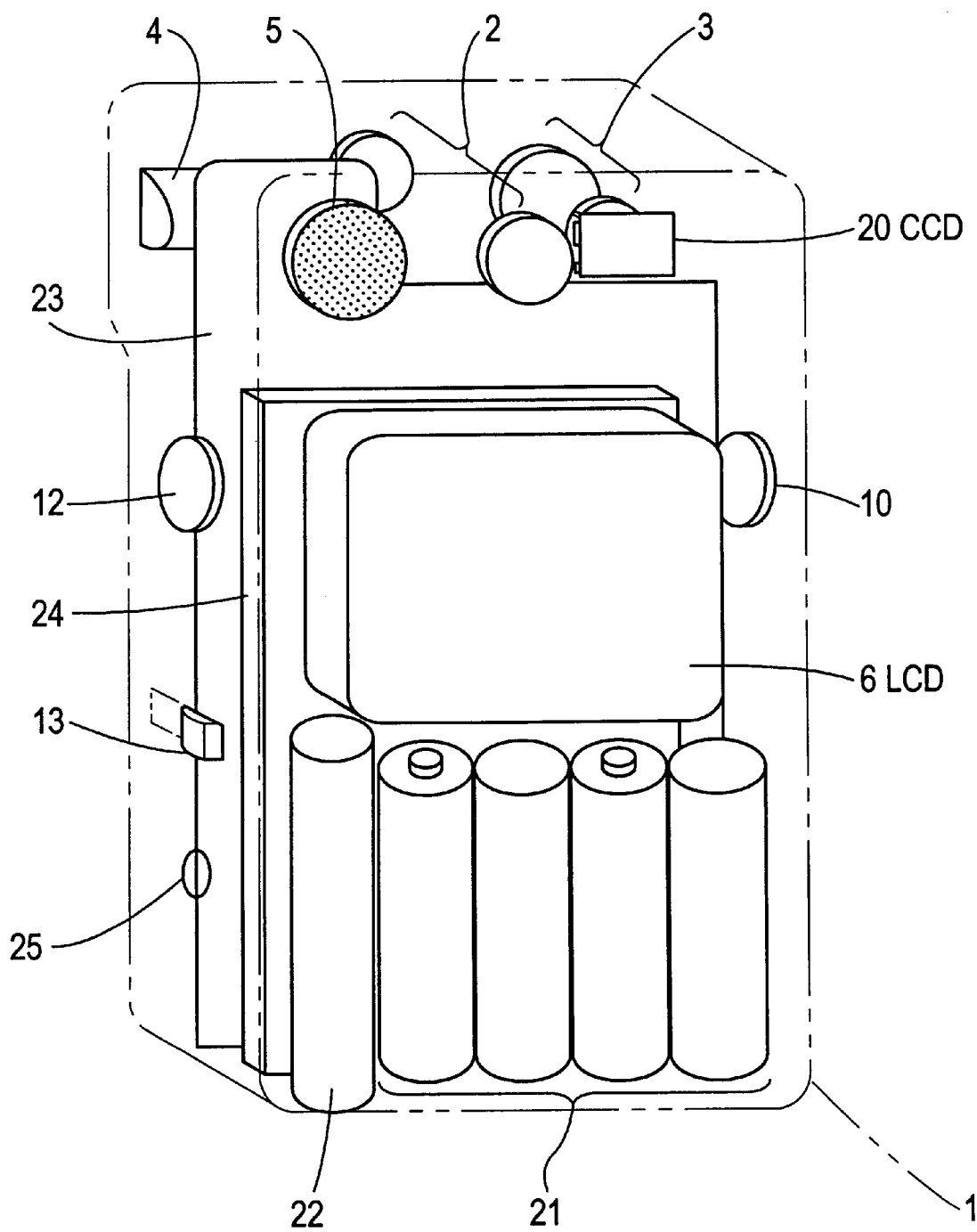
FIG. 3 is a cut-away view showing internal components of the electronic camera of FIG. 2.

FIG. 3 shows the internal structure of a preferred embodiment of an electronic camera 1 according to the invention. Light from the object is imaged through the shooting lens 3 onto a CCD 20 behind the shooting lens (surface X2 side) and photo-electrically converted to an image signal.

Four cylindrical AAA dry cell batteries 21 are placed side by side below the LCD 6, and the electric power stored in the batteries 21 is supplied to the apparatus as needed. A capacitor 22 is next to the batteries 21 to accumulate the electric charge necessary to cause the strobe 4 to emit light. Various control circuits are formed on the circuit board 23 to control each part of the electronic camera 1. A removable memory card (recording medium) 24 is between the circuit board 23 and the LCD 6 and batteries 21. Various data may be input into the electronic camera 1 (as explained below) and recorded in pre-assigned regions of the memory card 24.

In a preferred embodiment the memory card 24 is removable, but a memory in which various data can be recorded may be provided on the circuit board 23. Moreover, various data recorded on the memory card 24 can also be output to an external personal computer or the like through an input/output port 25.

Figure 4:
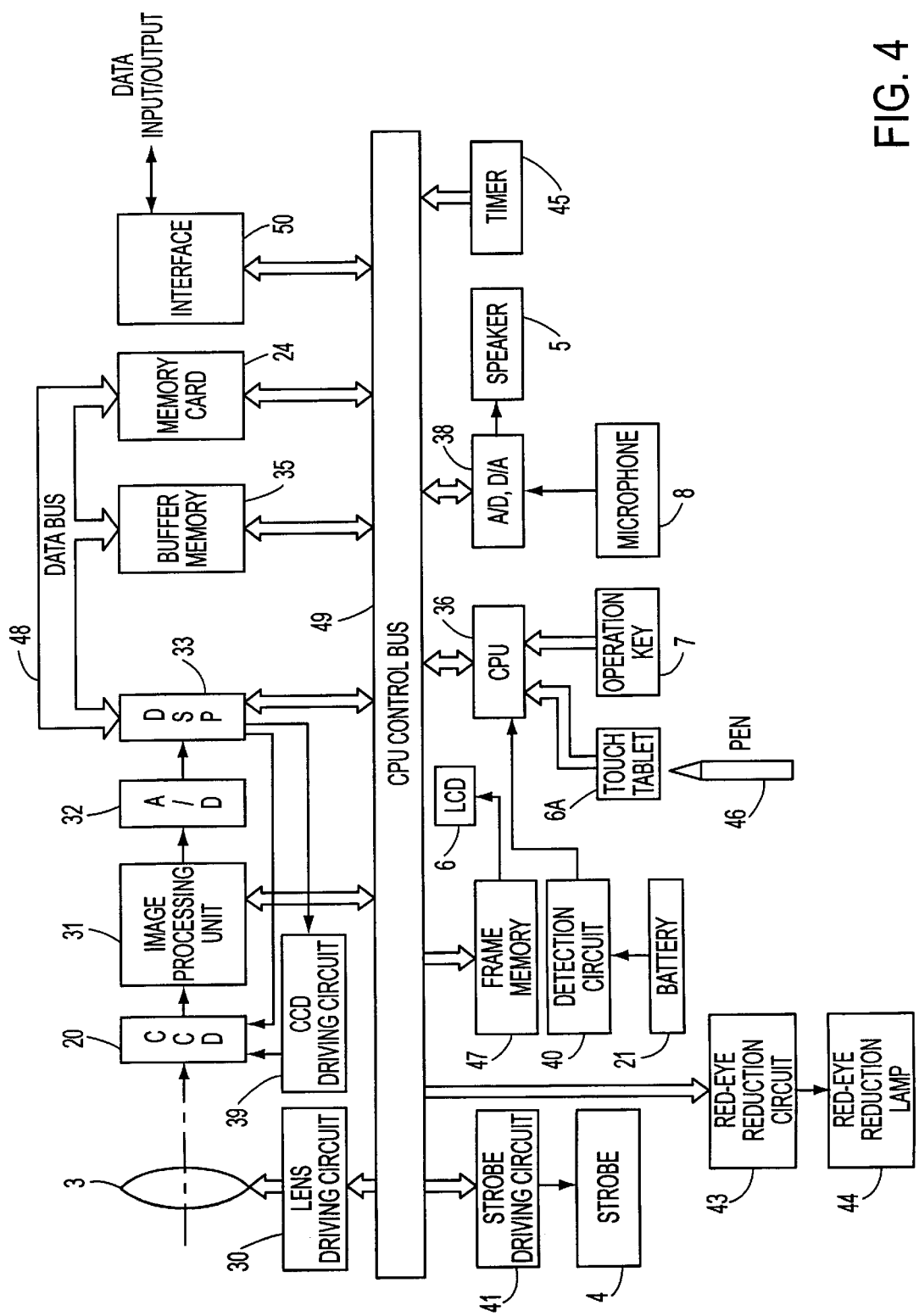
FIG. 4 is a block diagram of component interrelation in the electronic camera of FIGS. 1–3.

Next, an example of the internal electrical structure of the electronic camera according to a preferred embodiment of the invention is described with reference to the block diagram of FIG. 4. The CCD 20, which is equipped with a plurality of pixels, photoelectrically converts the portion of the object image impinging on each pixel to an image signal. A CCD driving circuit 39 that drives the CCD 20 is controlled by a digital signal processor (DSP) 33. A lens driving circuit 30 causes the shooting lens 3 to move in a direction parallel to the optical axis, so that focusing control or the like is accomplished.

An image processing unit 31 includes a double sampling correlation circuit (DSCC) and an automatic gain control circuit (AGC). The DSCC samples the image signals photo-electrically converted by the CCD 20 with a preset timing. The AGC controls the gain of the signals sampled by the DSCC. An analog/digital (A/D) conversion circuit 32 digitizes the image signals sampled by the DSCC of the image processing unit 31, and supplies the result to the DSP 33.

The DSP 33 supplies the digitized object image data to a buffer memory 35 where they are stored. The object image data stored in the buffer memory 35 are read out, and after undergoing (for example) Joint Photographic Experts Group (JPEG) format compression, are supplied via the data bus 48 and recorded in a preset region (object image recording region) of the memory card 24. A central processing unit (CPU) 36 acquires the shooting date and time from a timer 45, and records this information on the object image recording region of the memory card 24, as header information for the object image data.

The microphone 8 inputs sound and supplies a corresponding sound signal to an analog/digital-digital/analog (A/D-D/A) converter 38. The A/D-D/A converter 38 converts the sound signal into a digital sound signal, which it supplies to the DSP 33. The DSP 33 compresses the digital sound signal, and supplies the compressed digital sound signal data to the memory card 24, where they are recorded in a predetermined region (the sound recording region). At this time the recording date and time data are also recorded in the sound recording region of the memory card 24 as header information for the sound data. Sound data read from the memory card 24 are decompressed by the DSP 33 and converted into an analog sound signal by the A/D-D/A converter 38. The analog sound signal is then output by the speaker 5 connected to the A/D-D/A converter 38.

A strobe driving circuit 41 controlled by the CPU 36 drives the strobe 4, which emits light with a preset timing to illuminate the object. A red-eye reduction lamp driving circuit (red-eye reduction circuit) 43 is controlled by the CPU 36 and drives a red-eye reduction lamp 44 that emits light with a preset timing.

When the user presses the touch tablet 6A with the pen 46 to create a line drawing, the CPU 36 reads the x–y coordinates corresponding to the position pressed on the touch tablet 6A, and accumulates this coordinate data in a predetermined memory (not shown) as the line drawing is entered. In addition, the CPU 36 supplies the line drawing information accumulated in the memory to the memory card 24 along with header information such as the date and time when the line drawing information was input, and records this information in the line drawing recording region of the memory card 24.

The buffer memory 35 and frame memory 47 are connected to the CPU 36 via a CPU control bus 49, and the LCD 6 is connected to the frame memory 47. Furthermore, the object image corresponding to the object image data stored in the buffer memory 35 can be displayed on the LCD 6 via the frame memory 47. However, the object image data that has undergone compression processing is supplied to the buffer memory 35 via the data bus 48 after being decompressed by the DSP 33.

A detection circuit 40 detects the voltage of the battery 21 and supplies the corresponding data to the CPU 36. In addition, when the operation keypad 7 and a switch such as the release switch 10, the power source switch 11, the sound recording switch 12, or the continuous shooting mode switch 13 or the like are operated, a signal corresponding to this operation is supplied to the CPU 36, which executes the corresponding process. An interface 50 can accomplish input and output of various data with an external device such as a personal computer or the like via the input/output port 25.

The sound input and output process in a preferred embodiment operates as follows. When the power source switch 11 shown in FIG. 1 is switched to the side labeled "ON", power is supplied to the electronic camera 1, and when the sound recording switch 12 on the surface Y2 is pressed, the recording process (the process that accomplishes the input and recording of sound) is started. Sound input via the microphone 8 is converted into digital sound data by the A/D-D/A converter 38, and after a compression process, which may be Pulse Code Modulation (PCM) or some other method, has been performed by the DSP 33, the digital sound data are supplied to the memory card 24 and recorded in the sound recording region of the memory card 24. At this time, data such as the recording date and time or the like are recorded as header information for the compressed sound data in the sound recording region of the memory card 24. This process may be continuously executed while the sound recording switch 12 is pressed, or executed for only a predetermined time after the sound recording switch 12 has been pressed.

The sequence of events involved in shooting an object is now described. First, the case when the continuous shooting mode switch 13 is switched to S (single frame) mode is described. First, power is supplied to the electronic camera 1 when the power source switch 11 on surface Y1 is switched to the side labeled "ON". When the object is viewed through the viewfinder 2 and the release switch 10 on surface Y1 is pressed, the object shooting process begins.

Light from the object observed through the viewfinder 2 is imaged by the shooting lens 3 onto the pixels of the CCD 20. Each pixel of the CCD 20 photoelectrically converts its portion of the object image, resulting in an image signal that is sampled by the DSCC of the image processing unit 31. The AGC of the image processing unit 31 controls the gain of the image signal, and following this the image signal is supplied to the A/D conversion circuit 32 to be digitized. The digital image signal is then supplied to the DSP 33.

The DSP 33 supplies the digitized object image data to the buffer memory 35, where they are stored. The CPU 36 compresses the object image data in accordance with a JPEG format that is a combination of discrete cosine transformation, quantization and Huffman encoding. Following this, the compressed object image data are supplied to the memory card 24 via the data bus 48. The memory card 24 holds the object image data supplied from the DSP in the object image recording region. At this time, the shooting date and time data are recorded as header information for the above-described object image data in the object image recording region of the memory card 24.

When the continuous shooting mode switch 13 is switched to the S (single frame) mode, only one frame is shot each time the release switch 10 is pressed, even if the release switch 10 is continuously held in the depressed position. In addition, when the release switch 10 is continuously pressed for at least a predetermined length of time, the object image just shot can be displayed on the LCD 6.

Next, the case wherein the continuous shooting mode switch 13 is switched to the L (continuous low speed shooting) mode is described. Power is supplied to the electronic camera 1 when the power source switch 11 is switched to the side labeled "ON", and when the release switch 10 on surface Y1 is pressed, the object shooting process begins.

Light from the object observed using the viewfinder 2 is imaged by the shooting lens 3 onto the pixels of the CCD 20 which photo-electrically convert the object image into an image signal. The image signal is sampled by the DSCC of the image processing unit 31 eight times per second. However, out of the image signals corresponding to all of the pixels from the CCD 20, the DSCC samples image signals from only one-fourth of the pixels each time.

The image signals sampled by the DSCC (the image signals of one-fourth of all the pixels of the CCD 20) are supplied to the A/D conversion circuit 32, and are there digitized and output to the DSP 33. The digitized object image data are supplied from the DSP 33 to the buffer memory 35 for storage. The DSP 33 reads out the object image data stored in the buffer memory 35 and compresses the object image in accordance with the JPEG format. The compressed object image data are supplied to the memory card 24 via the data bus 48, and are recorded in the object image recording region. At this time, the shooting date and time data are recorded in the object image recording region of the memory card 24 as header information for this object image.

Next, the case wherein the continuous shooting mode switch 13 is switched to the H (continuous high speed shooting) mode is described. Power is supplied to the electronic camera 1 when the power source switch 11 is switched to the side labeled "ON". When the release switch 10 on surface Y1 is pressed, the object shooting process begins.

Light from the object observed through the viewfinder 2 is imaged by the shooting lens 3 onto the CCD 20. The object image is photo-electrically converted into an image signal and is sampled by the DSCC of the image processing unit 31 at a rate of 30 times per second. Out of the image signals corresponding to all of the pixels of the CCD 20, the DSCC samples only one-ninth of the pixels each time.

The image signals sampled by the DSCC (the image signals of one-ninth of all the pixels of the CCD 20) are supplied to the A/D conversion circuit 32, and are there digitized and output to the DSP 33. The DSP 33 supplies the digitized object image data to the buffer memory 35, where they are stored. The DSP 33 reads the object image data stored in the buffer memory 35 and compresses the object image in accordance with the JPEG format. In this way, the digitized and compressed object image data are supplied to the memory card 24 via the data bus 48, and recorded in the object image recording region of the memory card along with header information such as the shooting date and time.

During shooting of the object, the strobe 4 is operated as necessary to illuminate the object. In this embodiment, the strobe 4 emits light with a preset timing under the control of the strobe driving circuit 41. In addition, it is also possible to have the red-eye reduction lamp 44 emit light to suppress the red-eye phenomenon. In this embodiment, the red-eye reduction lamp 44 emits light with a preset timing under the control of the red-eye reduction circuit 43.

Next, entry of two-dimensional information (pen-input line drawing information) via the touch tablet 6A is described. When the tip of the pen 46 touches the touch tablet 6A, data corresponding to the x–y coordinates of the touched location are supplied to the CPU 36, which writes object image data corresponding to a dot of predetermined size to a position corresponding to the x–y coordinates in the frame memory 47. This causes a dot to be displayed at the corresponding position on the LCD 6.

As described above, the touch tablet 6A formed on the surface of the LCD 6 is made using transparent material, allowing the user to observe the dot formed on the LCD 6 beneath the position where the touch tablet 6A is pressed by the tip of the pen 46. This gives the user the impression that he is writing directly onto the LCD 6. In addition, when the pen 46 is moved while in contact with the touch tablet 6A, a line is displayed on the LCD 6 along the loci over which the pen 46 moves. Furthermore, when the pen 46 is intermittently moved on the touch tablet 6A, a dashed line is displayed on the LCD 6 in accordance with the movement of the pen 46. In this way, the user can input onto the LCD 6 any desired line drawing, text, diagram, or the like using the touch tablet 6A. The user, by operating a color selection switch (not shown), can also select from among a number of colors such as black, white, red, blue, or the like as the color of the line drawing displayed on the LCD 6.

After the line drawing information has been input using the pen 46 and touch tablet 6A, when the execution key 7B of the operation key 7 is pressed the line drawing information temporarily accumulated in the buffer memory 35 is compressed by the DSP 33 and supplied to the memory card 24 via the CPU control bus 49 along with the header information. These data are recorded in the line drawing recording region of the memory card 24. In addition, when the object image is displayed on the LCD 6, any line drawing information input using the pen 46 is composed in the frame memory 47 and displayed on the LCD 6 simultaneously with the object image information.

With the above method, the line drawing information can be compressed along with the object image. However, the line drawing information input using the touch tablet 6A contains a large amount of information with high spatial frequency components, and consequently when its image is compressed using the JPEG format, the compression efficiency is poor and the degree of information reduction is small. In addition, JPEG compression is not suitable for compression of a small amount of line drawing information because it is not totally reversible, so that when the information is decompressed and displayed on the LCD 6, gathers, smears, and accompanying defects in the information are displayed.

Hence, the line drawing information is compressed using (for example) a run length method such as used in fax machines and the like. The run length method is a method that compresses the line drawing information by scanning the line drawing in the horizontal direction and encoding the length over which the information (points) of various colors such as black, white, red, blue or the like continue, and the length over which a lack of information (an absence of pen input) continues. By using this run length method, it is possible to efficiently compress the line drawing information, and in addition, it is possible to suppress defects in the information even when the compressed line drawing information is decompressed. When the amount of information in the line drawing information is relatively low, it is not necessary to compress it.

In addition, as described above, when the object image is displayed on the LCD 6, any line drawing data are combined with the object image data in the frame memory 47, and a composite image of the object image and the line drawing is displayed on the LCD 6. However, the object image data are recorded in the object image recording region of the memory card 24, and the line drawing data are recorded separately in the line drawing recording region. In this way, the two sets of data are recorded in differing regions, so the user can erase either from the combined image. In addition, it is possible to compress the object image data using an individual compression method and to record this data in the line drawing recording region.

When data are recorded in at least one of the sound recording region, the object image recording region, and the line drawing recording region of the memory card 24, it is possible to display on the LCD 6 a table display screen showing a table of the recorded information. In the table display screen of the LCD 6 shown in FIG. 5, the date the information was recorded (in this case, Aug. 25, 1995) is displayed in the lower portion of the screen, and the time of the recording is displayed at the left-most side of the screen.

Figure 5:
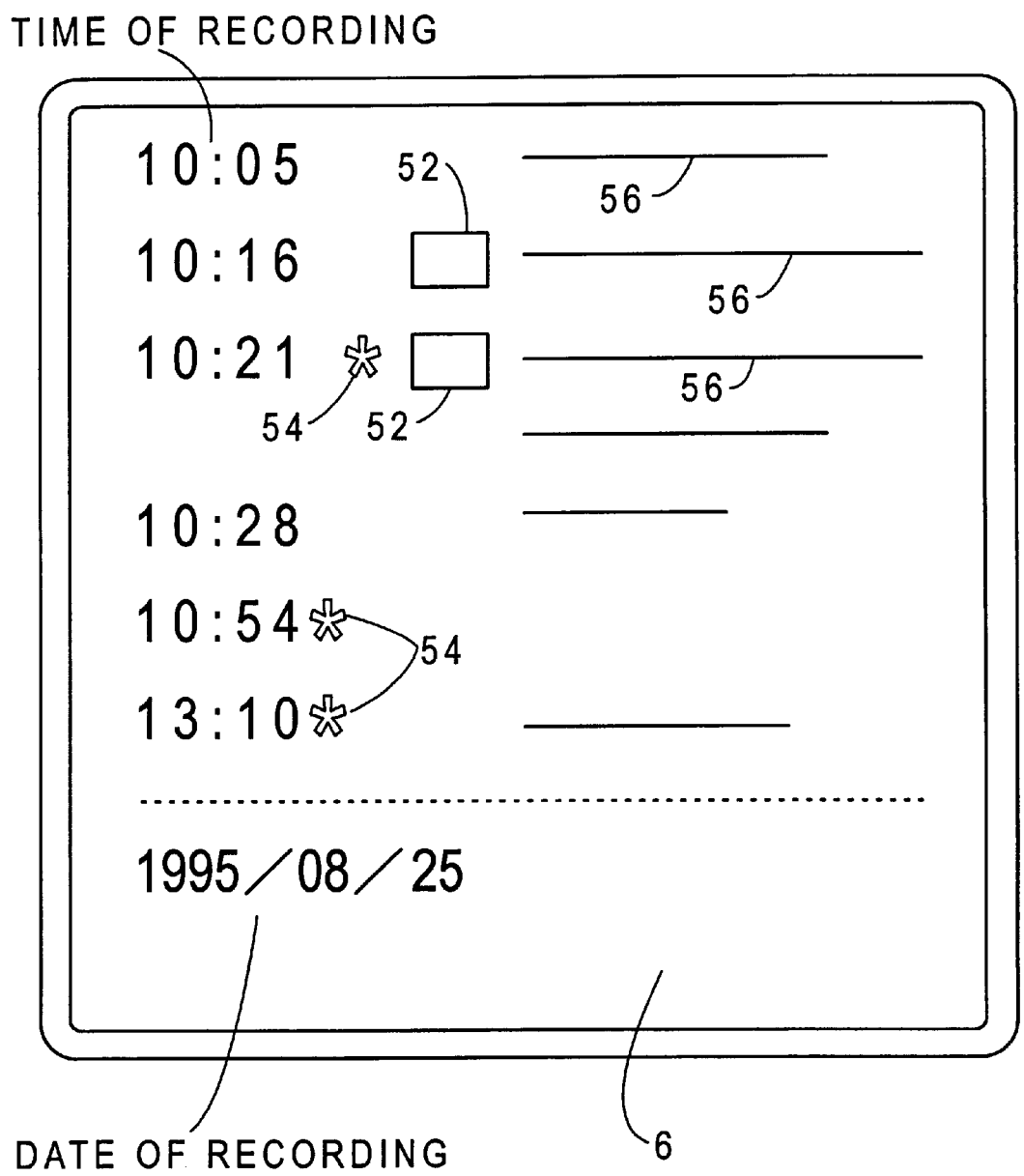
FIG. 5 is an example of a display screen for the electronic camera of FIGS. 1–4.

To the right of the recording time, a thumbnail image 52 is displayed if an object image was recorded. This thumbnail image 52 is a reduced object image created by thinning the bit map data corresponding to each object image recorded in the memory card 24. In FIG. 5, object image information for the data recorded (input) at "10:16" and "10:21" appear, but not for the data recorded at "10:05", "10:28", and "10:54". The memo symbol "*" 54 indicates a memo recorded as line drawing information. If sound information has been recorded, on the right side of the display region for the thumbnail image a sound information bar 56 is displayed, its length corresponding to the time interval during which the sound was recorded.

The user selects information to be reproduced by pressing the tip of the pen 46 in the rectangular region of the screen where the desired information is displayed, and commands the reproduction of the selected information by pressing the tip of the pen 46 on the execution key 7B shown in FIG. 2. For example, when the band-shaped region where "10:05" is displayed is pressed by the pen 46 on the screen shown in FIG. 5, the CPU 36 instructs the DSP 33 to reproduce the sound corresponding to the selected recording date and time (10:05). The DSP 33 reads the sound data from the memory card 24 in accordance with the command from the CPU 36, and after executing a decompression process, supplies this information to the A/D-D/A converter 38. The A/D-D/A converter 38 converts the decompressed sound data supplied from the DSP 33 into an analog signal, which it outputs to the speaker 5. When an earphone (not shown) is connected to the earphone jack 9, sound is output from the earphone instead of from the speaker 5.

For reproducing the object image data recorded on the memory card 24, the user selects an object image by pressing the desired thumbnail image with the tip of the pen 46, and then presses the execution key 7B to command reproduction of the selected information. The object image data corresponding to the selected thumbnail image is read from the memory card 24 by the DSP 33 and is decompressed. The decompressed object image data are supplied to the frame memory 47 via the CPU control bus 49, and stored in the memory as bit map data. Next, the control signal corresponding to the object image data stored in the frame memory 47 is supplied to the LCD 6, and the corresponding object image is displayed. If sound has also been recorded (as it was at recording times "10:16" and "10:21" in the example shown in FIG. 5) the sound may be output from the speaker 5 or from the earphone, as described above.

Figure 6:
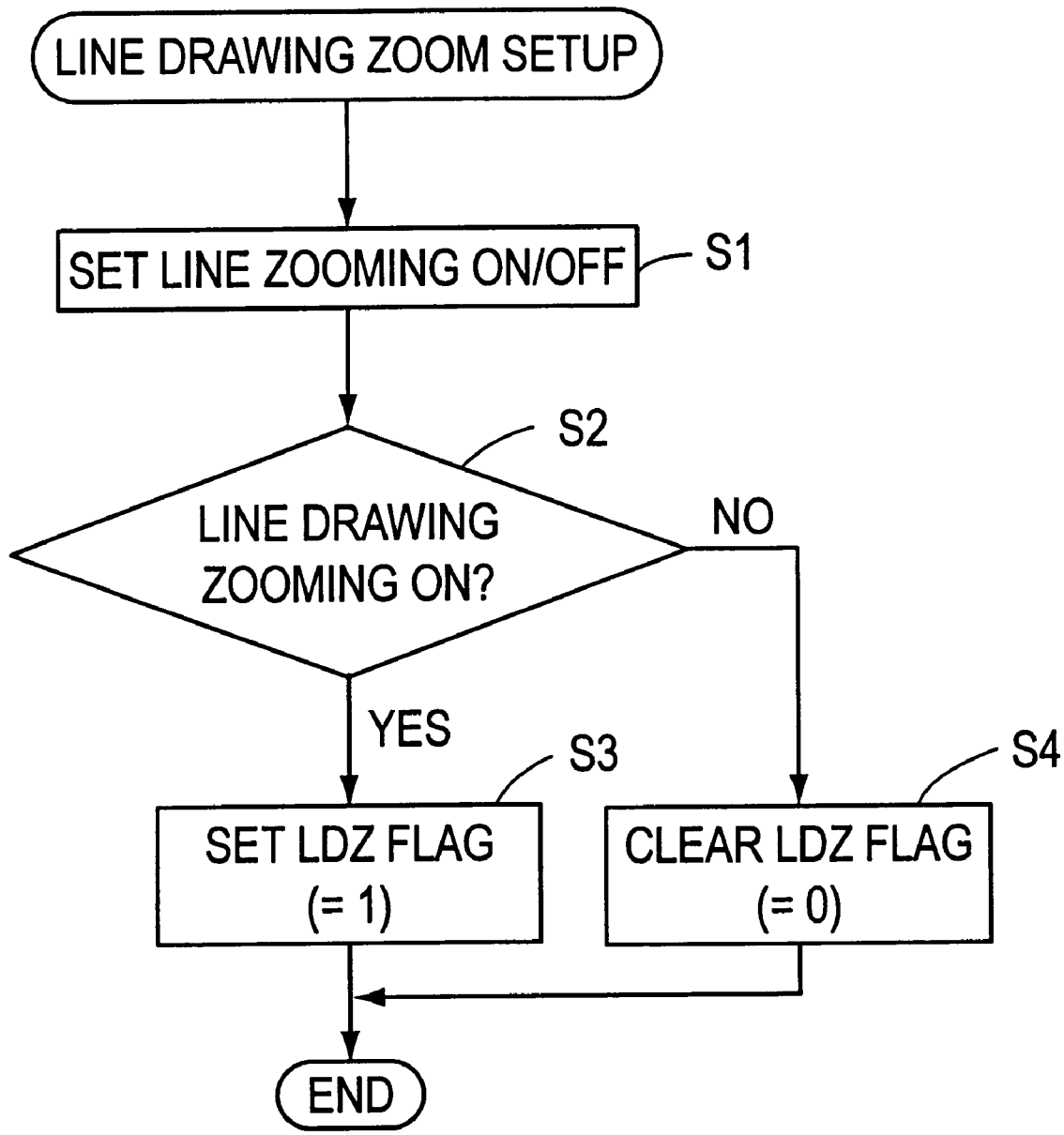
FIG. 6 is a flowchart of a sequence for setting the line drawing zooming (LDZ) mode ON or OFF.

Next, operation when zooming the object image and line drawing is described. FIG. 6 is a flowchart showing a sequence for determining whether the line drawing is zoomed when the object image is zoomed. First, in step S1, zooming (ON) or not zooming (OFF) of the line drawing is selected. This can be accomplished by displaying a line drawing zooming selection screen on the LCD 6, such as that shown in FIG. 7, and having the user select his preferred choice using the pen 46. For example, in FIG. 7 "LINE DRAWING ZOOMING" and choices "YES/NO" are displayed on the LCD 6. For line drawing zooming, "YES" is selected using the pen 46. For no line drawing zooming, "NO" is selected using the pen 46. In the case of the screen shown in FIG. 7, the selection item "NO" is underlined in the display, indicating that line drawing zooming is currently OFF.

Next, in step S2, a determination is made by the CPU 36 as to whether line drawing zooming is ON. When line drawing zooming has been turned ON, at step S3 the line drawing zooming (LDZ) flag is set by assigning to it a value of one. On the other hand, when it is determined that line drawing zooming has been turned OFF, at step S4 the LDZ flag is cleared by assigning to it a value of zero. When either step S3 or step S4 has been performed, the line drawing zooming setting process is complete.

Next, zooming of the object image and/or the line drawing displayed on the LCD 6 is described with reference to FIG. 8. First, in step S11 the area of the object image to be zoomed is determined. This can be accomplished by means of the LCD 6 and the pen 46. For example, the area to be zoomed can be designated by pressing with the pen 46 on the touch tablet 6A at a position corresponding to the center of the region where zooming is desired, and then pressing the touch tablet 6A at a position corresponding to the right side of the region where zooming is desired. Naturally, designating the desired zooming region is not restricted to the above-described example; various other methods may also be employed.

In step S12, zooming of the object image of the designated region of the object image is commanded by pressing the execution key 7B using the pen 46. The CPU 36 then instructs the DSP 33 to zoom and display the designated region of the object image. In step S13 the DSP 33 creates zoomed object image data corresponding to the designated region of the object image in accordance with the commands from the CPU 36, and writes this data into the frame memory 47. In this way, the object image in the designated region is zoomed and displayed on the screen of the LCD 6.

Next, in step S14, a determination is made by the CPU 36 as to whether the LDZ flag is currently set. If the LDZ flag has been set, in step S15 the CPU 36 zooms the line drawing in the region designated in step S11 in proportion to the zooming of the object image, and displays the zoomed line drawing with the zoomed object image. To do this, the CPU 36 creates new line drawing data corresponding to the line drawing in the designated region, zoomed with the same zoom ratio as the object image, and writes this zoomed line drawing data to the frame memory 47. Thus, the line drawing is proportionally zoomed and displayed on the LCD 6 along with the zoomed object image.

Figure 9A:
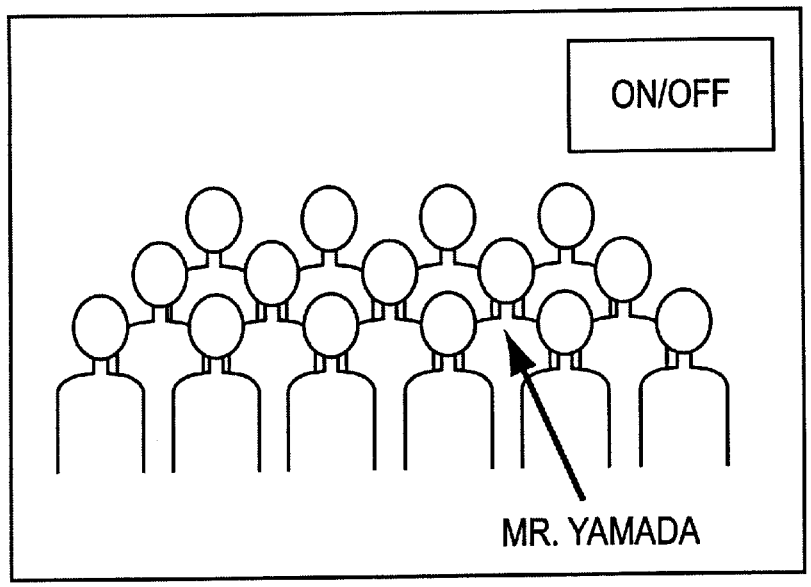
FIG. 9A shows a first sample screen with a line drawing superimposed on an object image.
Figure 9B:
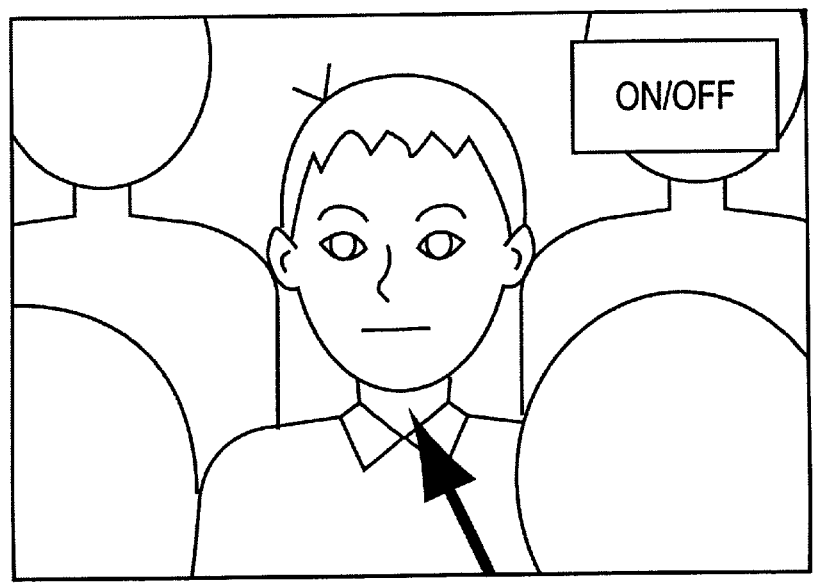
FIG. 9B shows the screen of FIG. 9A after the line drawing and object image have been proportionally zoomed.

FIGS. 9A and 9B show an example of the screen when the line drawing is zoomed along with the object image. As shown in FIG. 9A, an arrow is inserted in order to specify a particular individual (in this case, Mr. Yamada) in an object image (e.g., a group photograph) where a number of people are photographed. Then, a prescribed region centered on Mr. Yamada is designated using the touch tablet 6A and the pen 46, and commands are sent so that zooming of this region (enlarging, in this case) is accomplished. The CPU 36 sends commands to the DSP 33 to zoom and display the designated region of the object image.

The DSP 33 creates zoomed object image data corresponding to the designated region of the object image in accordance with the commands from the CPU 36, and writes this data into the frame memory 47. The CPU 36 also creates line drawing data corresponding to zooming that portion of the line drawing included in the same designated region as in the case of the object image, and writes the data to the frame memory 47. In this way, the zoomed object image and the zoomed line drawing are displayed together on the LCD 6, as shown in FIG. 9B. In this case, Mr. Yamada's image is enlarged and displayed on the LCD 6, and the arrow that designates Mr. Yamada is also enlarged and displayed.

Figure 8:
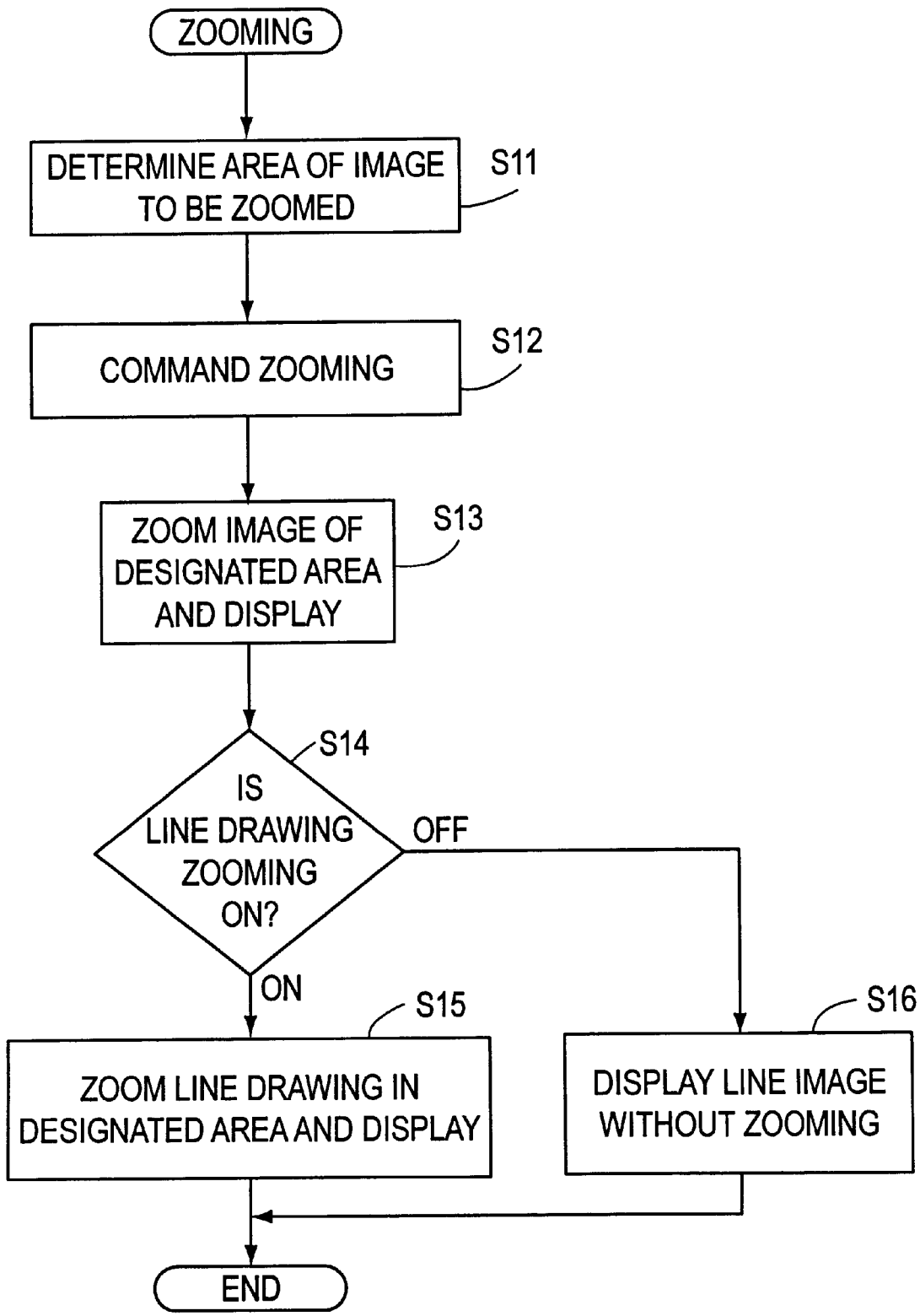
FIG. 8 is an example of a zooming sequence in a preferred embodiment of the invention.

On the other hand, if it is determined in step S14 of FIG. 8 that the LDZ flag has not been set, in step S16 the CPU 36 commands a display on the LCD 6 with the line drawing not zoomed. In this case, the line drawing that was input is displayed without change, even if the object image is zoomed.

Figure 10A:
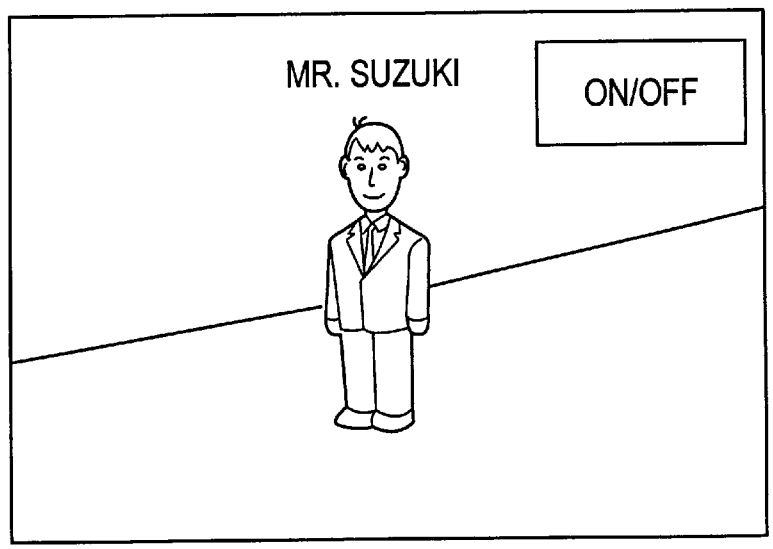
FIG. 10A shows a second sample screen with a line drawing superimposed on an object image.
Figure 10B:
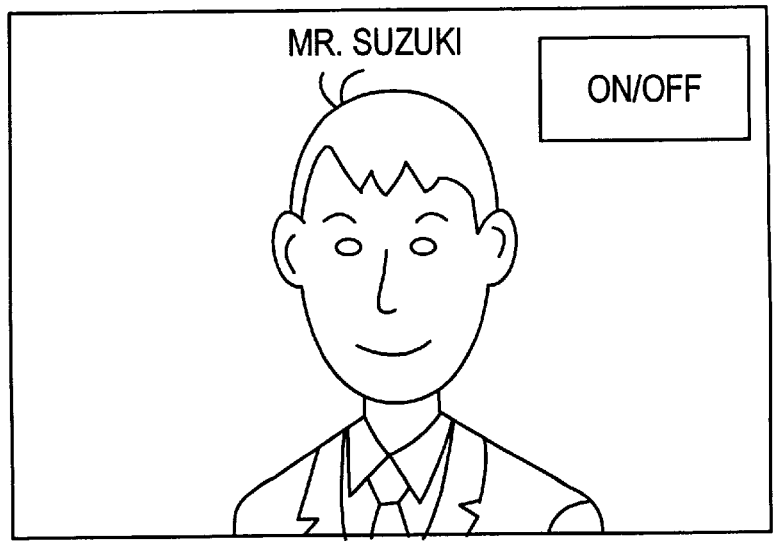
FIG. 10B shows the screen of FIG. 10A after the object image, but not the line drawing, has been zoomed.

FIGS. 10A and 10B show an example of the screen when the line drawing is not zoomed even though the object image is zoomed. For example, as shown in FIG. 10A, the name of an individual (in this case, Mr. Suzuki) is input to correspond to the image of this individual, and is recorded as the line drawing information. When an area centered around Mr. Suzuki's face is designated using the touch tablet 6A and the pen 46, and commands are sent to zoom the object image in this region (in this case, to enlarge), the CPU 36 sends commands to the DSP 33 to zoom and display the object image in the designated region. The DSP 33 creates zoomed object image data corresponding to the designated region of the object image in accordance with the commands from the CPU 36, and writes this data into the frame memory 47. Thus, the zoomed object image is displayed on the LCD 6, as shown in FIG. 10B. In this case, Mr. Suzuki is displayed enlarged on the LCD 6.

However, the CPU 36 causes the line drawing to be displayed on the LCD 6 as before, without change. That is to say, the CPU 36 displays on the LCD 6 the line drawing that corresponds to the data from the memory card 24 without zooming. Thus, the line drawing ("MR. SUZUKI") is displayed at the same size and in the same position as previously, as shown in FIG. 10B.

Accordingly, when it is not necessary to zoom the line drawing even when the object image is zoomed, such as when the explanation for the entire screen is input as a line drawing, or in a case where all or a portion of the line drawing would protrude from the screen if the line drawing were zoomed, it is possible to keep from zooming the line drawing even if the object image is zoomed, by turning the line drawing zooming feature OFF.

In addition, it is also possible to turn line drawing. zooming ON or OFF for each object image individually. For example, it is possible to turn line drawing zooming ON for the composite image shown in FIG. 9A, and to turn line drawing zooming OFF for the composite image shown in FIG. 10A. In this way, when the object image shown in FIG. 9A is zoomed, the line drawing is also zoomed automatically, while when the object image shown in FIG. 10A is zoomed, the line drawing is not zoomed.

It is also possible for the user to select on the LCD 6 whether the line drawing is displayed at all. When an object image is displayed on the LCD 6 and line drawing display is turned ON, if line drawing information corresponding to this object image has been recorded on the memory card 24, the line drawing corresponding to this line drawing information is also displayed on the LCD 6. On the other hand, when a prescribed object image is displayed on the LCD 6 and line drawing display is turned OFF, even if line drawing information corresponding to this object image is recorded on the memory card 24, the line drawing corresponding to this line drawing information is not displayed on the LCD 6.

To turn the line drawing display ON or OFF, a switch (e.g., an icon with the words "ON/OFF") may be displayed on the LCD 6, for example in the upper right of the screen as shown in FIGS. 9A, 9B, 10A and 10B. The user can toggle the line drawing display ON and OFF by using the pen 46 to press on the touch tablet 6A at the appropriate position of the displayed icon. When a portion of the object image cannot be seen because of the line drawing, it is possible to make this portion visible by turning the line drawing display OFF as described above, thus erasing the line drawing from the screen. Additionally, when the information displayed by the line drawing has been understood and display of the line drawing is no longer necessary, it is possible to erase only the line drawing from the screen by turning the line drawing display OFF.

In alternative embodiments, the apparatus may be configured so that when the same switch is pressed once, only the line drawing is erased; when the switch is pressed twice the line drawing is displayed and only the object image is erased; and when the switch is pressed three times, both are displayed. Alternatively, a separate switch could be provided to cause the object image to be erased and only the line drawing displayed, in order to more easily distinguish the line drawing by erasing the object image from the background.

Although only enlargement of the images has been described, the invention can be applied to allow reduction of the images as well. In this case, when an object image is reduced an accompanying line drawing can be left the same size, or reduced along with the object image.

In the illustrated embodiment, the camera controller is implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like).

The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine is capable of implementing the flowcharts shown in FIGS. 13 and 17 can be used as the controller. As shown, a distributed processing architecture is preferred for maximum data/signal processing capability and speed.

Additionally, compression algorithms other than JPEG and PCM can be used with the invention.

The invention also is applicable to information processing apparatus other than the disclosed electronic camera.

While this invention has been described in conjunction with specific embodiments outlined above, it is evident that many alternatives, modifications and variations will be apparent to those skilled in the art. For example, in a preferred embodiment the viewfinder 2 is an optical device, but it is also possible to use a liquid crystal viewfinder employing a liquid crystal. In addition, in a preferred embodiment only one microphone is provided, but it is also possible to provide two microphones, one on the right and one on the left, to record the sound in stereo. Further, in a preferred embodiment the various types of information are input using a pen-type pointing device, but it is also possible to input this information using one's finger, for example.

Furthermore, the screen is not limited to the example display screen shown in FIGS. 5 and 7, for it is possible to use screens with various layouts. Similarly, the type of operation key and the layout described above are also merely examples, and are intended to be illustrative and not limiting.

Accordingly, the preferred embodiments of the invention as set forth herein are intended to be illustrative, not limiting. Various changes may be made without departing from the scope of the invention as defined in the following claims.

What is claimed is:

1. An information processing apparatus for displaying an object image and a line drawing, comprising:
   first and second zooming means for zooming the object image and the line drawing, respectively;
   selection means for selecting a zooming mode from a set of modes including a first mode and a second mode; and
   control means for:
      when the selection means has selected the first mode as the zooming mode, causing the second zooming means to zoom the line drawing when the object image is zoomed by the first zooming means; and
      when the selection means has selected the second mode as the zooming mode, keeping the second zooming means from zooming the line drawing when the object image is zoomed by the first zooming means.

2. The information processing apparatus of claim 1, wherein the second zooming means zooms the line drawing in proportion to the zooming of the object image by the first zooming means.

3. The information processing apparatus of claim 2, further comprising imaging means for forming the object image.

4. The information processing apparatus of claim 2, further comprising line drawing input means for inputting the line drawing.

5. The information processing apparatus of claim 2, further comprising recording means for recording the object image and the line drawing.

6. The information processing apparatus of claim 2, further comprising:

imaging means for forming the object image;

line drawing input means for inputting the line drawing;

recording means for recording the object image and the line drawing; and display means for displaying at least the object image and the line drawing.

7. The information processing apparatus of claim 2, further comprising display means for displaying at least the object image and the line drawing.

8. The apparatus of claim 7, wherein said information processing apparatus is an electronic, digital camera, and said display means includes a display screen located on a surface of said camera.

9. An information processing and display method, comprising:

inputting a first object image and a first line drawing;

selecting a picture portion of the first object image to be zoomed;

zooming the picture portion to obtain a zoomed object image;

selecting a zooming mode from a set of modes including a first mode and a second mode;

displaying a composite image;

when the second mode is selected as the zooming mode, forming the composite image from the zoomed object image and the first line drawing; and when the first mode is selected as the zooming mode:

selecting, based on the selected picture portion, a drawing portion of the first line drawing;

zooming the drawing portion to obtain a zoomed line drawing; and forming the composite image from the zoomed object image and the zoomed line drawing.

10. The information processing and display method of claim 9, wherein the zooming of the drawing portion is proportional to the zooming of the picture portion.

11. An information processing apparatus for displaying an object image and a line drawing, comprising:

a photoelectric conversion device that converts a light image of an object into object image signals;

a line drawing input device through which a user inputs line drawing data;

a memory, coupled to the photoelectric conversion device and to the line drawing input device, to store the object image signals and the line drawing data;

a display on which at least the image of the object and the line drawing are displayed; and a controller, coupled to the memory and to the display, to control the display of the image of the object and the line drawing on the display, the controller being capable of independently zooming the image of the object and the line drawing.

12. The information processing apparatus of claim 11, wherein the controller zooms the line drawing in proportion to the zooming of the image of the object.

13. The information processing apparatus of claim 11, wherein the information processing apparatus is an electronic, digital camera, and the photoelectric conversion device includes a lens that forms the light image of the object on the photoelectric conversion device.

14. The information processing apparatus of claim 11, further comprising:

a selection device, coupled to the controller, to enable the selection between a first zooming mode and a second zooming mode; wherein:

when the first zooming mode is selected, the controller zooms the line drawing and the image of the object; and when the second zooming mode is selected, the controller zooms the image of the object without zooming the line drawing.

* * * * *